Feb. 7, 1950  W. A. FLUMERFELT  2,496,869
JOINT CONSTRUCTION
Filed July 31, 1944  2 Sheets-Sheet 1
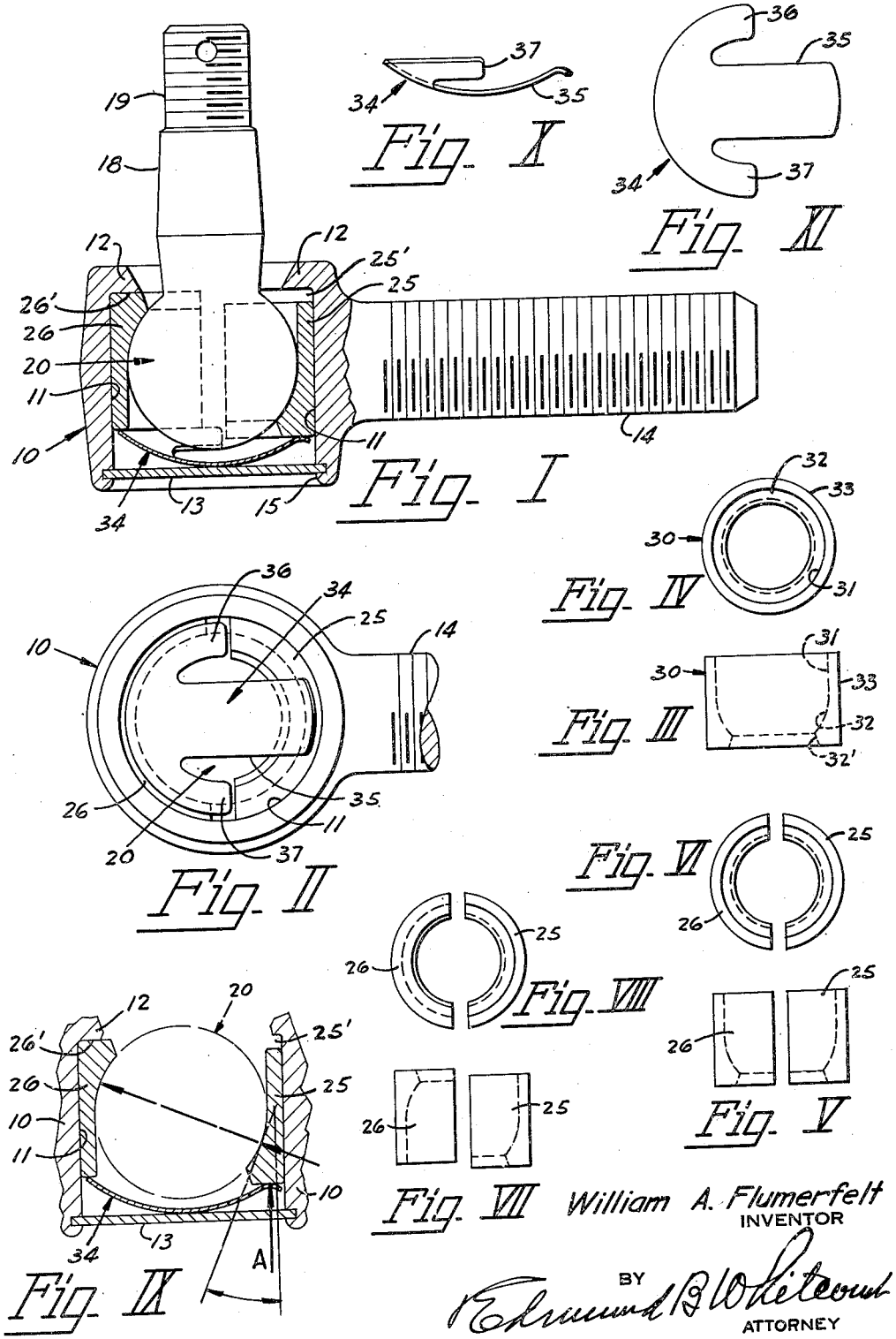
William A. Flumerfelt
INVENTOR
BY
ATTORNEY Feb. 7, 1950 W. A. FLUMERFELT 2,496,869
JOINT CONSTRUCTION
Filed July 31, 1944 2 Sheets-Sheet 2
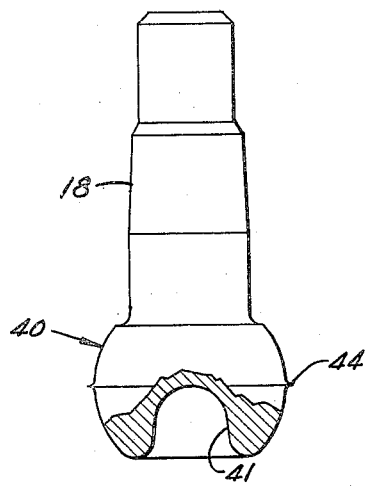
Fig. XII
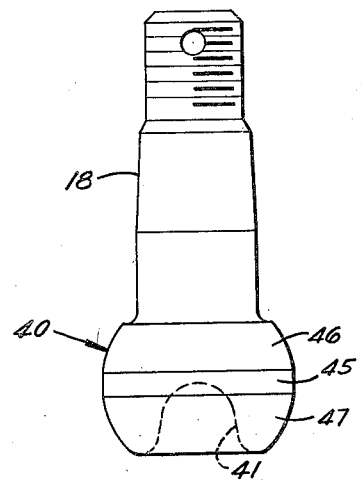
Fig. XIII
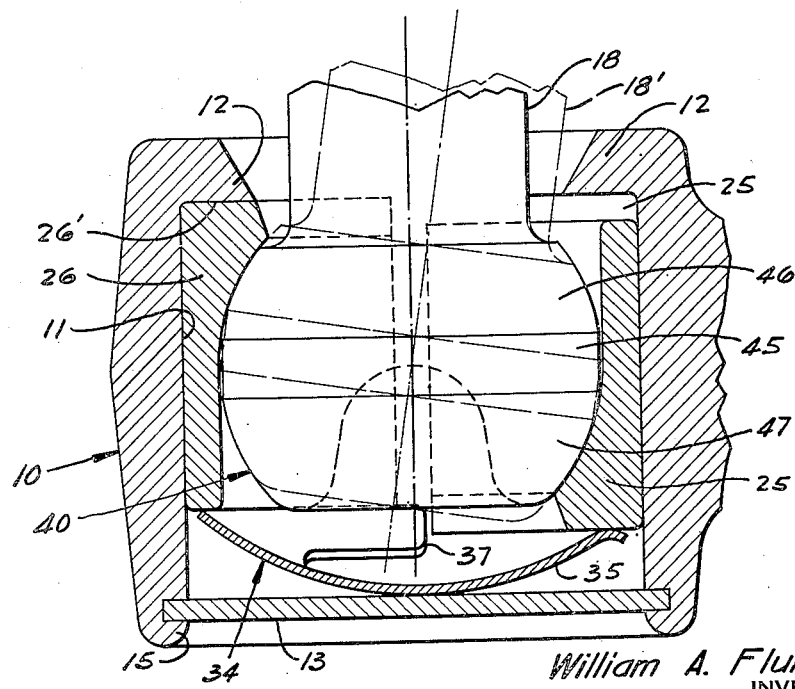
Fig. XIV
William A. Flumerfelt
INVENTOR
BY Edmund B. Whitcomb
ATTORNEY Patented Feb. 7, 1950

2,496,869

UNITED STATES PATENT OFFICE 2,496,869

JOINT CONSTRUCTION

William A. Flumerfelt, Columbus, Ohio, assignor to The Columbus Auto Parts Company, Columbus, Ohio, a corporation of Ohio Application July 31, 1944, Serial No. 547,453

10 Claims. (Cl. 287—90)

This invention relates to improvements in automatic take up ball and socket joints for tie rod assemblies used in the steering mechanism of a vehicle.

The objects of the invention include a construction in which a minimum of parts is used and a reduction in cost attained, at the same time producing a simplified joint arranged for automatic compensation for wear in use; a joint in which unitary ball seats and take-up means are provided; a construction in which the assembly provides a unique and simple arrangement facilitating both the action in use and the automatic wear compensation as indicated; novel spring urging means and the assembly thereof in the joint; and a simplification of the various cooperating parts and elements of the joint construction, which are easily assembled, providing an overall joint construction which is very efficient in its construction and operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of two forms of the invention, one of which may be preferred, in which:

Figure I is a vertical section of an embodiment of my improved ball and socket joint;

Figure II is a bottom plan of Figure I;

Figure III is an elevational view of the ring from which a pair of wedge shaped ball seats are made;

Figure IV is a plan view of Figure III;

Figure V is an elevational view with the ring split apart to form the separate ball seats;

Figure VI is a plan view of Figure V;

Figure VII is a view of the ball seats of Figure VI reversely positioned as they are located within the socket housing;

Figure VIII is a plan view of Figure VII;

Figure IX is a diagrammatic view partly in section showing the action of the joint in operation;

Figure X is a side elevational view of the improved spring member used in my assembly;

Figure XI is a plan view of the spring of Figure X;

Figure XII is an elevation partly in section of a modification in which the ball and ball stud unit is formed by forging, leaving a flash on the equator of the ball;

Figure XIII is a similar view showing the flash removed;

Figure XIV is an enlarged assembly view of the modified construction using the type of ball and ball stud illustrated in Figure XIII.

Referring to the drawings, the socket housing 10 has a straight cylindrical bore 11 therein leaving a retaining flange 12 at one end having a smaller opening therethrough for reception of the ball stud. Integral washer retaining means 15 is formed at the other end for the spring retainer 13. The socket has a threaded extension 14 forming a tenon adapted to be connected to the tie rod of a vehicle.

In Figure I, I have illustrated a standard type of ball stud 18 threaded at 19 to be held in place by suitable nuts and washers to a member of the steering mechanism of the vehicle as will be understood by those skilled in the art. The ball stud carries, in the form illustrated in Figure I, the standard type of ball 20.

Both the method of manufacture and the construction of the unitary ball seat and take-up members 25 and 26 together with the assembly thereof in the joint constitute an important feature of the present invention. In this connection, I provide a ring 30, illustrated in Figure III, which is either screw machined in the form shown, or cold coin pressed to form the shape illustrated in section in Figure III and in plan in Figure IV. It will be noted that this ring 30 has a cylindrical bore extending from the top down to less than half the distance of the length of the ring indicated at 31 while the lower part is arranged to provide spherically shaped ball seating surfaces 32 spaced from the end of the ring as shown at 32'. This ring is then cut in two longitudinally, as shown in Figures V and VI thereby forming in halves the two unitary ball seats and take-up members 25 and 26, which in Figures VII and VIII are shown with transposed ends, one in relation to the other as this illustrates the manner in which they are assembled in the joint. It will be noted that the ring 30 has a cylindrically shaped outer surface, illustrated at 33 corresponding to the size of and adapted to fit the bore 11 of the housing 10.

The simplified manner in which these unique, combined ball seats and take-up members 25 and 26, located and assembled in the housing 10, operate includes the use of the leaf type spring 34 which has the main spring portion 35 and the arcuate formed and shaped true design ears 36 and 37, the latter adapted when the joint is assembled as shown in Figures I, II and IX to contact the downwardly extending lower edge or front face of the rim of the ball seat 25, this arrangement preventing the spring from rotating out of correct position in use.

In assembling the joint as shown in Figures I and II, it will be noted that the reversely arranged halves of the ring 30, constituting the ball seat members 26 and 25, are positioned so that the top edge of seat 26 contacts the overhanging flange 12 of the housing 10 at 26' while space 25' is provided between the top end of the other ball seat member 25 and flange 12. The spring 34 held in place by the spring retaining washer 13, bears against the lower end of each of said ball seats as shown and constantly urges the seat 25 upwardly (in the particular position illustrated in Figures I and IX) while at the same time ball 20 is forced by spring 34 into contact with the thick end or wedge shaped bearing portion of seat 26 which is also held in contact at 26' with the housing flange 12 by the spring. The spring retaining washer 13 upon which spring 34 seats is securely held in position by the turned over flange 15 on the housing 10 and firmly holds all parts in assembled position.

The pressure of the spring 34, its action, as well as the position of the ball and seats in the assembled ball joint is more fully illustrated diagrammatically in Figure IX. Here it will be seen that the main line of pressure is at an angle and comes above and below the center line of the ball. As seat member 26 contacts flange 12 at the line 26' it can not move upwardly but is resiliently held in contact with said flange by the spring 34 which forms a fulcrum for the action of the spring which at the same time, bearing against the retaining plate 13 presses against the lower end of the ball seat 25 constantly urging the latter upwardly in the direction of the arrow A indicated in Figure IX. Upon wear occurring, in view of the fact that the seat 26 is stationary, this seat 25 progresses into the space 25' at a rate twice that of the occurring wear, (assuming equal wear on both seats) as this movement compensates for the wear on both seats. In the assembly as shown and indicated in Figure IX, the cylindrical formation of the wall or bore 11 restrains the ball seats from outward movement when the spring 34 forces the thickened portion of ball seat 25 into the constricted annular space surrounding the ball at its horizontal equator and coincidentally forces the ball into contact with the thickened portion of the seat 26. In other words, in my construction one combined ball seat and wedge 26 remains stationary while the other ball seat and wedge 25 backed by the non-converging cylindrical surface travels alone axially toward the end of the cylinder, thus maintaining axial alignment of the parts throughout the range of longitudinal movement of the ball seat maintaining the original alignment of the steering wheels.

In my construction the arrangement of the spring, in addition to being simple and cheap to manufacture, has two true design ears 36 and 37 which contact at their ends as shown in Figure II with the downwardly extending portion 32' of the ball seat 25 which prevents the spring from rotating out of correct position thereby facilitating and maintaining the correct operation in use of the take up between the ball and seats.

In the modification shown in Figures XII, XIII, and XIV, I utilize a type of stud and ball in the combination which further permits an overall reduction in cost in manufacturing the joint. In this embodiment, instead of being of a standard type such as the ball 20, the ball stud 18 has a ball 40 having a cavity 41 in the end, as shown, to save material, and in this instance, the unit is made by a forging, which, as illustrated in Figure XII, leaves a flashing or rib 44 around the ball, which rib must be removed before the ball stud can be assembled in a joint. Trimming the flash 44 in the least expensive manner would result in an annular flat at the portion 45 illustrated in Figure XIII. I have found, however, that in the one inch size balls, if this flat surface does not exceed 3/64" in longitudinal width, measured axially of the ball stud, and does not otherwise modify the spherical shape of the other portions of the ball 40, which has the spherical bearing surfaces 46 and 47, I can satisfactorily use this type of ball stud in the assembly as illustrated in Figure XIV, thus reducing overall costs. In this manner it will be seen that it is unnecessary to accurately, spherically machine the portion where the rib 44 is removed, since the ball 40 may have the annular flat 45 thereon without producing, in effect, an out-of-round ball.

In Figure XIV I have illustrated the action of the assembly using the type of ball stud illustrated in Figures XII and XIII. Here, it will be noted that the spherical bearing portions of the ball 40 properly seat in the ball seats 25 and 26 made, constructed, and assembled as in the embodiment of Figures I through XI. In action I have found that the maximum movement still provides sufficient bearing surface without bringing the flat surface 45 onto the main or necessary working surfaces of the ball seats, as long as the width of the flat portion 45 is kept down to the minimum mentioned above in the size of ball and ball stud having an inch spherical diameter plus or minus the usual tolerances. In other words, the ball stud 18, in the embodiment illustrated in Figure XIV may move to a position as shown by dotted lines 18' to contact or nearly contact the edge of the flange 12 of the housing 10, before sufficient portion of the flat 45 encroaches upon the spherical bearing portion of the ball seats 25 and 26. By making these ball seats in the manner illustrated above in Figures III to VIII, and assembling in reversed position, it will be seen that the working surfaces, as illustrated in Figure IX, are located diametrically opposite above and below the medium plane of the ball as in the other embodiment, which feature particularly cooperates with the use of the ball 40. The full and dotted lines shown in Figure XIV illustrate the action of this embodiment and show the limit of the tilt which is suggested by the dotted line position 18'.

It is apparent that, within the scope of the invention, modifications and different arrangements may be made other than is herein disclosed, and the present disclosure is illustrative merely, the invention comprehending all variations thereof.

What I claim is:

1. In combination, a socket housing having a cylindrical bore therethrough, an inwardly extending flange at one end of said bore; a ball stud; a ball on said stud located within said bore; a pair of reversely arranged substantially identical integral take-up and ball seat units and ball seats between said ball and said housing arranged to form a spherical shaped seating surface for said ball, one of said take-up and ball seat units being in contact with said housing flange and the other spaced therefrom; spring retaining means in said housing at the end opposite to said flange; and spring means between said units and said spring retaining means, said spring means operating to maintain the one take-up and ball seat unit in contact with said housing flange and for moving the other unit toward said flange upon wear with said ball in contact with both said units.

2. In combination, a socket housing having a cylindrical bore therethrough, an inwardly extending flange at one end of said bore; a ball stud; a ball on said stud located within said bore; a pair of reversely arranged substantially identical integral take-up and ball seat units between said ball and said housing arranged to form a substantially spherical shaped seating surface for said ball, and having a narrow extension connected with said spherically shaped portion; the narrow portion of one take-up and ball seat unit facing in one direction and the narrow portion of the other take-up and ball seat unit facing in the opposite direction; spring retaining means at the housing end opposite to said flange; and spring means between said units and said spring retaining means, said spring means operating to maintain one of said units in contact with said housing flange and for moving the other unit toward said flange upon wear with said ball maintained in constant contact with both said units.

3. In combination a socket housing having a cylindrical bore therethrough and a shank having an extension adapted to be connected to a tie rod, said housing having a flange on one end thereof with an opening therethrough to receive a ball stud; a ball stud extending through said opening and having a ball located within said bore; a pair of reversely arranged, integrally combined seat and take-up members located between said ball and said bore of said housing, the outer surface of said members being cylindrically shaped to fit said bore, said members having a thickened ball seating portion and a narrow extension therefrom, said members being arranged one diametrically opposite to the other with the narrow portion of the seat and take-up members extending in opposite directions, said members forming spherically shaped ball seating surfaces one above and one below the center line of the ball, spring retaining means connected with said housing at the end opposite to said first mentioned flange and spring means interposed between said retaining means and the edges of said seat and take-up members adjacent that end of the housing.

4. In combination a socket housing having a cylindrical bore therethrough and a shank having an extension adapted to be connected to a tie rod, said housing having a flange on one end thereof with an opening therethrough to receive a ball stud; a ball stud extending through said opening and having a ball located within said bore; a pair of similar reversely arranged, integrally combined seat and take-up members located between said ball and said bore of said housing, the outer surface of said members being cylindrically shaped to fit said bore, each of said members having one portion cylindrically shaped and another portion spherically shaped to form wedge shaped ball seating surfaces, the end wall of one of said members being adapted to seat against the flange on said housing, the cylindrical portion of said members being longer than the spherical portion and the cylindrical portion on the other of said members being spaced from said housing flange, spring retaining means connected with said housing at the end opposite to said first mentioned flange and spring means interposed between said retaining means and the edges of said seat and take-up members adjacent that end of the housing.

5. In a ball and socket joint, a housing having a cylindrical bore and a ball stud having a ball located within said bore; a pair of reversely arranged substantially identical combined integral ball seat and take-up members located between said ball and said housing, each having cylindrically shaped outer surfaces and inner spherically shaped ball seating surfaces, one on one side of the axis of the ball and the other on the other side thereof, the line of pressure between said ball and said ball seating surfaces being in an angular line with respect to the axis of said ball; and spring means interposed between said seat and take-up members and the housing to automatically take up for wear.

6. In combination a socket housing having a cylindrical bore therethrough and a shank adapted to have a connection with a tie rod, said housing having a flange on one end thereof with an opening therethrough to receive a ball stud; a ball stud unit having a ball and a ball stud, the stud extending through said opening, the ball located within said bore; said ball having an annular flat portion around the circumference of the ball; a pair of reversely arranged, integrally combined seat and wedge shaped members located between said ball and said bore of said housing, the outer surface of said members being cylindrically shaped to fit said bore, said members having spherically shaped ball seating surfaces located diametrically opposite each other, one above and the other below the flat portion around said ball, spring retaining means connected with said housing at the end opposite to said first mentioned flange; and spring means interposed between said retaining means and said seat and wedge-shaped members adjacent that end of the housing.

7. In combination a socket housing having a cylindrical bore therethrough and a shank adapted to have a connection with a tie rod, said housing having a flange on one end thereof with an opening therethrough to receive a ball stud; a ball stud unit having a ball and a ball stud, the stud extending through said opening, the ball located within said bore; said ball having an annular relatively narrow flat band portion around the circumference of the ball; a pair of reversely arranged, integrally combined seat and wedge shaped members located between said ball and said bore of said housing, the outer surface of said members being cylindrically shaped to fit said bore, the inner surface being spherically shaped, said members being arranged diametrically opposite each other with said spherical surfaces above and below the annular flat portion on said ball, spring retaining means connected with said housing at the end opposite to said first mentioned flange; and spring means interposed between said retaining means and said seat and wedge-shaped members adjacent that end of the housing.

8. In combination a socket housing having a cylindrical bore therethrough and a shank adapted to have a connection with a tie rod, said housing having a flange on one end thereof with an opening therethrough to receive a ball stud; a ball stud unit having a ball and a ball stud, the stud extending through said opening, the ball located within said bore; said ball having an annular relatively narrow flat band portion around the circumference of the ball; a pair of reversely arranged, integrally combined seat and wedge shaped members located between said ball and said bore of said housing, the outer surface of said members being cylindrically shaped to fit said bore, the inner surface of one of said members having a spherically shaped portion located on one side of the center line of said ball and extending adjacent the flat portion thereof; and an inner cylindrical portion on the other side of said median line, the other member having a surface spherically shaped and located on the opposite side of the median line of said ball and extending adjacent the flat portion thereof, said last mentioned member also having a cylindrical inner portion extending beyond the median line of said ball on the other side thereof; and spring means to retain said members and ball in said cylindrical bore of said housing.

9. In combination, a housing having a socket and an end opening therein; a ball and stud member extending through said end opening in said housing; ball seat members within the housing, each member having an outside configuration to fit within said socket in said housing, a spherically shaped inner seat portion adapted to contact a portion of the surface of said ball, and terminating in an extension on said seat member larger than said ball and spaced therefrom, said seat members being vertically opposed, with the spherical inner seat portion of one member located on one side, and the spherical seat portion of the other member located on the opposite side of the equator of said ball; and resilient means within said housing contacting one end of one of said seat members and the said extension end of the other seat member, said resilient means arranged to exert constant pressure to maintain the contacting surfaces of said seat portions and ball in operative relation and insure automatic take-up to compensate for looseness caused by wear.

10. In combination a socket housing having a cylindrical bore and a flange on one end thereof with an opening therethrough to receive a ball stud; a ball stud extending through said opening and having a full ball located within said bore; a pair of similar reversely arranged, integrally combined seat and take-up members located between said ball and said bore of said housing on opposite sides of the equator of the ball, the outer surface of said members being cylindrically shaped to fit said bore, each of said members having one portion cylindrically shaped and another portion spherically shaped and terminating a spaced distance from the end of the seat and take-up members to form wedge shaped ball seating surfaces, the end wall of one of said members being adapted to seat against the flange on said housing, said member being relatively stationary, the cylindrical portion on the other of said members being spaced from said housing flange, said last mentioned member being movable to take up for wear, spring retaining means connected with said housing at the end opposite to said first mentioned flange and spring means interposed between said retaining means and the edges of said seat and take-up members adjacent that end of the housing to move said movable member to compensate for wear.

WILLIAM A. FLUMERFELT.

REFERENCES CITED

The following references are of record in the file of this patent:

UNITED STATES PATENTS

| Number | Name | Date |
| --- | --- | --- |
| 1,031,982 | Caswell | July 9, 1912 |
| 1,050,422 | Birchwood | Jan. 14, 1913 |
| 1,891,804 | Flumerfelt | Dec. 20, 1932 |
| 2,108,814 | Flumerfelt | Feb. 22, 1938 |
| 2,205,981 | Klages | June 25, 1940 |
| 2,240,432 | Witchger | Apr. 29, 1941 |